Figure 1:
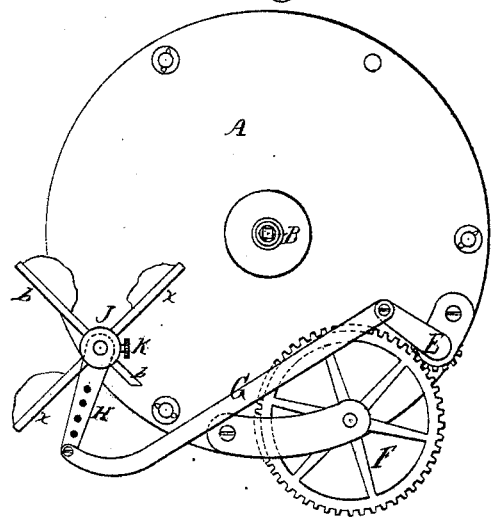
Figure 2:
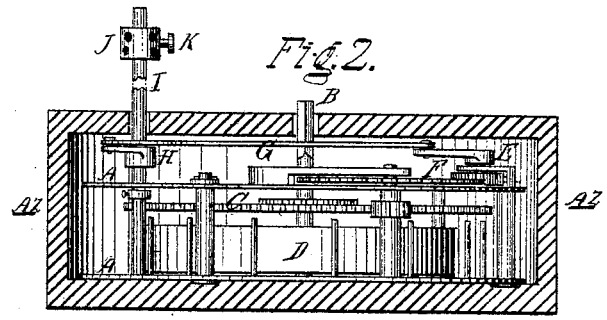

HIRAM C. CHANDLER.

Improvement in Automatic Fly Brushes.

No. 121,750.  Patented Dec. 12, 1871.

Witnesses.  Inventor.

UNITED STATES PATENT OFFICE.

HIRAM C. CHANDLER, OF PERU, INDIANA.

IMPROVEMENT IN AUTOMATIC FLY-BRUSHES.

Specification forming part of Letters Patent No. 121,750, dated December 12, 1871.

*To all whom it may concern:*

Be it known that I, HIRAM C. CHANDLER, of Peru, county of Miami and State of Indiana, have invented an Improvement in Fly-Brushes; and I do hereby declare that the following is a full description of the same, reference being had to the annexed drawing making a part of this specification.

A A are two plates, between which are placed the large wheel C and the spring D, said wheel working on the pinion of a second wheel, F, which wheel working on pinion of crank E attached to connecting-rod G, fastened by small screws to crank and shaker E and H, which, being connected with shaft I, on which is fastened the brush-carrier J, which is adjustable to any desired height by the set-screw K.

The spring D, being wound at B, gives rotation to crank E, giving a backward and forward motion to the shaft I by means of the connecting-rod G.

What I claim as my invention, and desire to secure by Letters Patent, is—

The combination, with the plates A A, of the wheel C operated by the spring D therewith connected, and the wheel F, the connecting-rod G, crank E, shaker H, and shaft I, to which the brushes are attached, all constructed and operated substantially as described and shown.

HIRAM C. CHANDLER.

Witnesses:
 JAMES M. BROWN,
 G. I. REED. (165)